United States Patent
Chang et al.

(10) Patent No.: US 8,073,500 B2
(45) Date of Patent: Dec. 6, 2011

(54) DETECTING THE PRESENCE OF MULTIPLE COMMUNICATION ACCESS TECHNOLOGIES

(75) Inventors: Henry S. Chang, San Diego, CA (US); Doug Dunn, Chula Vista, CA (US)

(73) Assignee: Kyocera Corporation, Kyoto (JP)

( * ) Notice: Subject to any disclaimer, the term of this patent is extended or adjusted under 35 U.S.C. 154(b) by 1075 days.

(21) Appl. No.: 11/859,647

(22) Filed: Sep. 21, 2007

(65) Prior Publication Data

US 2009/0082017 A1    Mar. 26, 2009

(51) Int. Cl.
- H04M 1/00 (2006.01)
- H04B 1/46 (2006.01)
- H04B 1/44 (2006.01)

(52) U.S. Cl. ......... 455/574; 455/82; 455/83; 455/553.1; 455/552.1

(58) Field of Classification Search .................. 455/561, 455/435.2, 552.1, 574, 82, 83, 553.1
See application file for complete search history.

(56) References Cited

U.S. PATENT DOCUMENTS

| | | | |
|---|---|---|---|
| 6,389,291 B1 | 5/2002 | Pande et al. | |
| 6,993,296 B2 | 1/2006 | Leyh et al. | |
| 7,092,676 B2 | 8/2006 | Abdelgany et al. | |
| 7,133,670 B1 | 11/2006 | Moll et al. | |
| 7,453,912 B2 * | 11/2008 | Laroia et al. | 370/526 |
| 7,899,488 B2 * | 3/2011 | Wangard et al. | 455/552.1 |
| 2001/0002920 A1 | 6/2001 | Kanazumi et al. | |
| 2004/0038652 A1 | 2/2004 | Khlat et al. | |
| 2004/0077383 A1 * | 4/2004 | Lappetelainen et al. | 455/574 |
| 2004/0152429 A1 * | 8/2004 | Haub et al. | 455/102 |
| 2004/0204035 A1 * | 10/2004 | Raghuram et al. | 455/553.1 |
| 2004/0259594 A1 | 12/2004 | Choi | |
| 2005/0032516 A1 | 2/2005 | Marchevsky | |
| 2005/0159123 A1 | 7/2005 | Lu | |
| 2005/0266874 A1 | 12/2005 | Lai et al. | |
| 2006/0084417 A1 | 4/2006 | Melpignano et al. | |
| 2006/0217147 A1 | 9/2006 | Olvera-Hernandez et al. | |
| 2006/0270382 A1 * | 11/2006 | Lappetelainen et al. | 455/343.2 |

FOREIGN PATENT DOCUMENTS

EP    1 011 203    6/2000

OTHER PUBLICATIONS

Grube, Gary, "Improved Different System Handover", Motorola (May 1996), http://www.priorartdatabase.com/IPCOM/000007669/ (accessed Dec. 7, 2007).

Karetsos et. al., "A hierarchical radio resource management framework for integrating WLANs in cellular networking environments", Wireless Communications, IEEE (Dec. 2005), http://ieeexplore.ieee.org/xpl/abssprintf.jsp?arnumber=1561940 (accessed Sep. 20, 2007).

(Continued)

*Primary Examiner* — Charles Appiah
*Assistant Examiner* — Emem Stephen

(57) ABSTRACT

A multimode wireless communication device and method for having the device detect a communication access technology is described. The multimode wireless device comprises a multimode transceiver module, a CAT detection module, and at least one CAT threshold level corresponding to each CAT. The multimode transceiver module is operatively coupled to a first antenna. The multimode transceiver module comprises at least two communication access technology (CAT) receiver modules operatively coupled to at least one antenna, wherein each CAT receiver module complies with a receiver requirement. The CAT detection module is operatively coupled to one of the CAT transceiver antenna and the CAT detection module is configured to detect a plurality of CAT RF energy levels associated with each CAT receiver module without activating the corresponding CAT transceiver module.

24 Claims, 5 Drawing Sheets

OTHER PUBLICATIONS

Liu et. al., "A handover method of broadcast/multicast service for multi-mode terminals", Siemens AG, http://www.priorartdatabase.com/IPCOM/000141013/ (accessed Sep. 24, 2007).

Siewerth, Jorg, "Multi-Mode Radio Access Module with Selection of Radio Access Technology", Siemens (Jan. 2001), http://www.priorartdatabase.com/IPCOM/000017490/ (accessed Sep. 24, 2007).

Vidales et. al, "Autonomic system for mobility support in 4G networks", Selected Areas in Communications, IEEE (Dec. 2005), http://ieeexplore.ieee.org/xpl/abssprintf.jsp?arnumber=1546099 (accessed Sep. 20, 2007).

Vidales et. al, "PROTON: a policy-based solution for future 4G devices", Policies for Distributed Systems and Networks, 2004, IEEE (Jun. 2004), http://ieeexplore.ieee.org/xpl/abssprintf.jsp?arnumber=1309173 (accessed Sep. 20, 2007).

Williams et. al, "Wireless Enabling Technologies to Support Interworking of Networks", Center for Communications Research, Dept. of Electrical and Electronic Eng., Univ. of Bristol, http://www-dse.doc.ic.ac.uk/Projects/UbiNet/ws2003/papers/williams.pdf (accessed Dec. 7, 2007).

* cited by examiner

DETECTING THE PRESENCE OF MULTIPLE COMMUNICATION ACCESS TECHNOLOGIES

FIELD OF THE INVENTION

This invention relates to a multimode wireless communication device detecting the presence of multiple communication access technologies (CATs) and a method for detecting each CAT supported by the multimode wireless communication device.

BACKGROUND

A multimode wireless communication device is a device that combines at least two different communication access technologies (CATs). The CATs may operate at different frequencies and may operate using different wireless standards, even though the CATs operate within the same frequency band. For example, a multimode handset may support cdma2000 and GSM at 800 MHz, and in a particular market having an A side operator and a B side operator there may be a combination of cdma2000 and GSM. Wireless handsets that support multiple CATs, e.g. CDMA2000, WCDMA, GSM, and WiFi, must determine the appropriate CAT to acquire the available CAT.

If a particular CAT is not available, then the multimode wireless communication device attempts to acquire a different CAT based on a pre-defined search list. The pre-defined search list may be a matrix or a look-up table. Even when a system is found in use, the CAT used in the system may not be the most desirable system due to the type of application launched by the user or the cost of the service due to roaming agreements. Thus, it is common for the multimode wireless communication device to continue with searches for alternate CATs.

Although the procedure for searching is straightforward, depending on the user's location and system availability, the amount of power used for searching for alternative CATs may be excessive. Furthermore, searching for an alternative CAT often requires the multimode wireless communication device to tune away from the current CAT disrupting ongoing services if the multimode wireless communication device is not capable of simultaneous CAT operation. Even if the multimode wireless device supports simultaneous operation on two CATs, the process of searching for an alternative CAT requires that the corresponding receiver module be turned on to process the CAT or determine the availability of the CAT.

Current multimode wireless communication devices have dedicated CAT receiver circuitry that meets the requirements set forth by standard performance requirements. In some cases, the wireless operator may add even more stringent requirements than those specified in the standard. Thus each CAT receiver module, in the multimode wireless communication device actively attempting to receive signals from the corresponding CAT network, is a drain on system resources such as the battery.

Acquisition time is also important. For wireless devices capable of simultaneous operation, it is possible that each CAT receiver be actively attempting to acquire networks for faster acquisition time. For wireless multimode devices not capable of simultaneous operation, the order for searching CAT may have a dramatic impact on acquisition time.

With respect to Software Defined Radio (SDR), although the receiver chain may be shared among multiple CATs, the SDR is bound by the standard performance requirements where a lower limit is set on the power consumption to perform a search. Thus, again each CAT must be actively attempting to receive signals from corresponding CAT network resulting in a drain of system resources.

SUMMARY

A multimode wireless device and a method for a multimode wireless device to detect a communication access technology (CAT) are described. The multimode wireless device comprises a multimode transceiver module, a CAT detection module, and at least one CAT threshold level corresponding to each CAT. The multimode transceiver module is operatively coupled to a first antenna. The multimode transceiver module comprises at least two communication access technology (CAT) receiver modules operatively coupled to at least one antenna, wherein each CAT receiver module complies with a receiver requirement. The CAT detection module is operatively coupled to one of the CAT transceiver antenna and the CAT detection module is configured to detect a plurality of CAT RF energy levels associated with each inactive CAT receiver module without activating the corresponding CAT transceiver module.

The CAT detection module may comply with different requirements than those of the CAT receiver's requirements. The CAT receiver's requirements may be based on the wireless standard requirements or it may be based on the more stringent requirements set forth by the wireless operator. Each inactive CAT threshold level is configured to be compared to the detected CAT RF energy levels so that a decision can be made to activate a CAT transceiver based on the result of the comparison and the necessity of using the detected CAT.

The multimode wireless communication device may also comprise a multimode transceiver module, a CAT detection module, and a triggering event. The multimode transceiver module is operatively coupled to an antenna. The multimode transceiver module comprises at least two communication access technology (CAT) transceiver modules operatively coupled to the antenna, wherein each CAT transceiver module complies with a CAT receiver requirement. The CAT detection module is operatively coupled to a CAT transceiver antenna. The CAT detection module complies with different requirements than the CAT receiver requirements. Additionally, the CAT detection module detects CAT RF energy levels associated with each inactive CAT receiver module without activating the corresponding CAT transceiver module. The triggering event activates the CAT detection module. The triggering event comprises at least one inactive CAT threshold level that is compared to the detected CAT RF energy levels and a logic component that activates one of the CAT transceiver modules based on the result of the comparison.

A method for a multimode wireless communication device to detect a communication access technology is also described. The method comprising coupling a CAT detection module to a CAT transceiver antenna. The method also comprises processing RF signals that correspond to at least two CAT transceiver modules that are operatively coupled to at least one antenna, wherein each CAT transceiver module complies with a CAT receiver requirement. The method then proceeds to detect CAT receiver energy levels with the CAT detection module without activating the corresponding CAT transceiver module. The CAT RF energy levels are associated with each inactive CAT. The CAT detection module complies with different requirements than the CAT receiver requirements. The method then proceeds to determine when to activate the CAT detection module by comparing at least one CAT threshold to the detected CAT RF energy levels.

DRAWINGS

The present invention will be more fully understood by reference to the following drawings which are for illustrative, not limiting, purposes.

DETAILED DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the wireless multimode devices described hereinafter may vary as to configuration and as to details. Additionally, the methods may vary as to details, order of the actions, or other variations without departing from the illustrative method disclosed herein.

A multimode wireless communication device comprising at least two communication access technology (CAT) receiver modules and a CAT detection module is described. Each CAT receiver module complies with a wireless standard having a receiver requirement. The CAT detection module detects CAT RF energy levels associated with each inactive CAT receiver module. The multimode wireless communication device detects the presence of at least one CAT by detecting RF signals from a separate "energy" signal path with the CAT detection module. Therefore, the wireless device and method is not restricted by standard requirements or the more stringent wireless operator's requirements for CAT detection. Additionally, the signal strength information collected by the CAT detection module can be communicated to a network, so that the wireless device may be switched to one of the detected CATs.

The CAT detection module provides an energy detector signal path that operates in conjunction with each CAT receiver housed by the wireless multimode wireless communication device. In the illustrative embodiments described below, a shared antenna may be used for CAT detection module and by at least one CAT receiver. In operation, at least one inactive CAT threshold level is compared to the detected CAT RF energy levels so that the comparison is performed without activating the corresponding inactive CAT receiver module. Typically, the inactive CAT threshold is greater than the wireless standard receiver requirement. The CAT detection module provides an energy detection signal path that is used to reduce battery consumption by not activating each CAT receiver module.

The CAT detection module does not need to conform to any industry standard, and the RF energy detector is configured to operate in conjunction with the dedicated receivers. The CAT detection module analyzes the RF energy present in the frequency band supported by the wireless device and it does not detect RF energy bands that the wireless device does not support.

Figure 1:
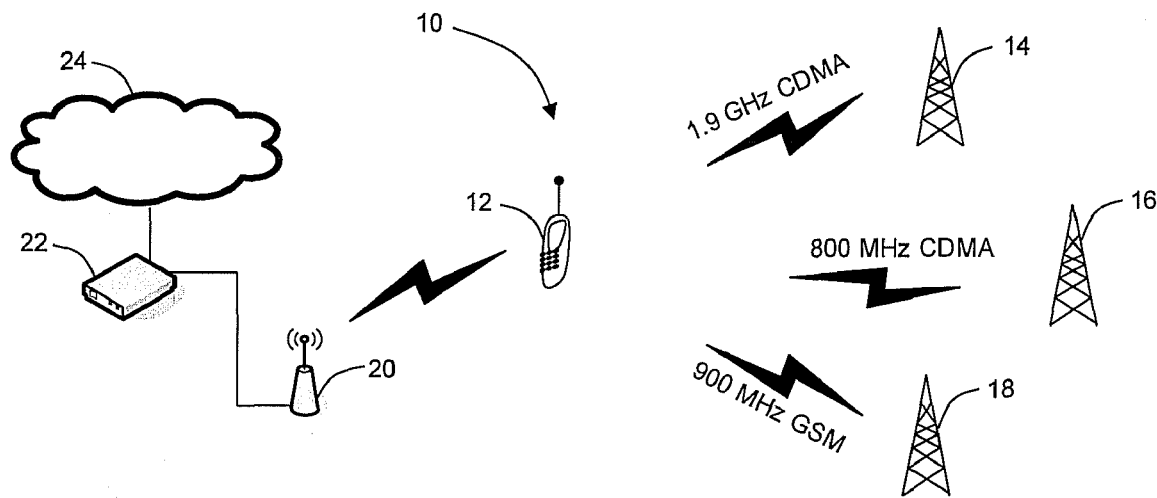
FIG. 1 shows an illustrative multimode wireless configured to communicate using a plurality of different communication bands.

Referring to FIG. 1 there is shown an illustrative multimode wireless communication device configured to communicate using a plurality of different communication bands. In the illustrative system 10, the wireless device is a wireless handset 12 that is configured to communicate with one or more base stations 14, 16 and 18 using different communication access technologies (CATs). The illustrative base stations may communicate with the wireless handset using a variety of different communication standards including, but not limited to, various forms of code division multiple access (CDMA), orthogonal frequency division multiple access (OFDMA), and time division multiple access (TDMA) wireless interfaces. By way of example and not of limitation, the wireless handset 12 communicates with base station 14 using a CAT that operates using CDMA technology at 1.9 GHz. The wireless handset 12 is also configured to communicate with base station 16 using a CAT that operates using CDMA at 800 MHz. Additionally, the illustrative handset 12 is configured to communicate with base station 18 using a CAT that operates using GSM technology at 900 MHz.

Additionally, the wireless handset 12 is also configured to monitor signals for a wireless local area network (WLAN) that may include a Wi-Fi access point 20 that is operatively coupled to a modem 22 that provides access to the Internet cloud 24. In operation, the wireless device 12 with the CAT detection module monitors the WLAN and avoids consuming excessive power by detecting Wi-Fi signals without activating the Wi-Fi CAT receiver module as described in further detail below.

The illustrative wireless device is a wireless handset 12 that may also be referred to as a mobile handset, mobile phone, wireless phone, portable cell phone, cellular phone, portable phone, a personal digital assistant (PDA), or any type of mobile terminal which is regularly carried by a user and has all the elements necessary for operation in a wireless communication system. Each CAT receiver module complies with a wireless standard having a receiver requirement. By way of example and not of limitation, the wireless standard is selected from the group of standards consisting of Code Division Multiple Access (CDMA), Global System for Mobile communications (GSM), Universal Mobile Telecommunications System (UMTS), Universal Mobile Broadband (UMB), wireless local area network (WLAN), wireless personal area network (WPAN), Mobile Broadband Wireless Access (MBWA) and Worldwide Interoperability for Microwave Access (WiMAX) or IEEE802.16. It shall be appreciated by those of ordinary skill in the art that the term wireless handset, mobile handset, wireless phone, and mobile phone are interchangeable.

Figure 2:
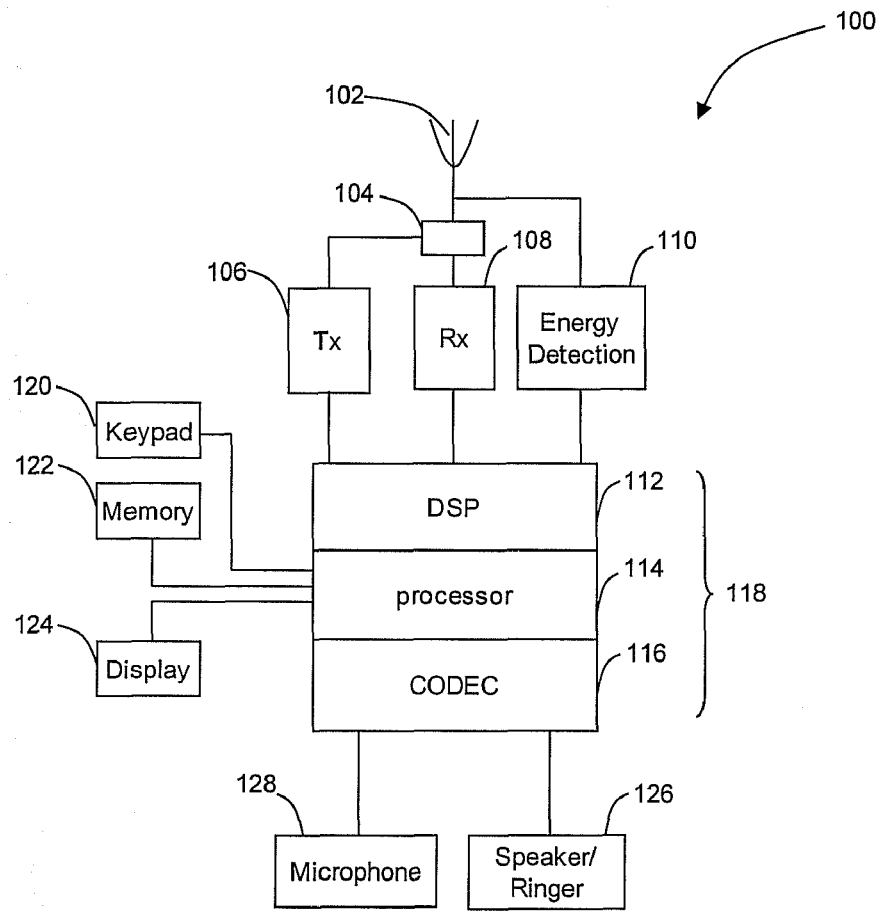
FIG. 2 shows an illustrative wireless handset with a CAT detection module.

Referring to FIG. 2 there is shown a wireless handset comprising a CAT detection module. The wireless handset 100 is a multimode wireless communication device that is configured to communicate using a plurality of different communication bands as generally described above. The illustrative multimode wireless handset 100 comprises a first antenna element 102 that is operatively coupled to a duplexer 104, which is operatively coupled to a multimode transmitter module 106, and a multimode receiver module 108. A CAT detection module 110 coupled to the antenna 102 is shown. In another embodiment that is not shown, the CAT detection module 110 is coupled to the receive port of the duplexer 104. In the illustrative embodiment, the CAT detection module 110 is operatively coupled to a control module 118 and uses control module resources to process computer instructions corresponding to the CAT detection module 110. The illustrative multimode transmitter module 106 and multimode receiver module 108 each comprise a plurality of CAT transmitter modules and CAT receiver modules that communicate using separate CATs. It shall be appreciated by those of ordinary skill in the art that the CAT transmitters and receivers may be embodied as a CAT transceiver and may share components.

An illustrative control module 118 comprises a digital signal processor (DSP) 112, a processor 114, and a CODEC 116 that are communicatively coupled to the transmitter 106 and receiver 108. It shall be appreciated by those of ordinary skill in the art that the CAT transmitter module and receiver module are typically paired and may be embodied as a CAT transceiver. Thus, the terms transmitter, receiver, and transceiver are used interchangeably herein and the distinctions shall be readily apparent to those of ordinary skill in the art.

The DSP 112 may be configured to perform a variety of operations such as controlling the antenna 102, the multimode transmitter module 106, the multimode receiver module 108, and the CAT detection module 110. The processor 114 is operatively coupled to a keypad 120, a memory 122, and a display 124. Additionally, the processor 112 is also operatively coupled to the CODEC module 114 that performs the encoding and decoding operations and is communicative coupled to a speaker or ringer 126, and a microphone 128. The CODEC module 114 is also communicatively coupled to the display 124 and provides the encoding and decoding operations for video.

The illustrative wireless handset 100 may be built as a light weight and small device adapted to be portable and may be conveniently carried around by a user. The wireless handset 100 is further adapted for caller operation and is enabled to permit a user to manually input data with the keypad 120 that may be a normal key pad, such as key pad for a cell phone or a PDA, and may additionally include specific input keys, such as a scrolling means or the like, to input particular information or to perform particular selection functions. Input data or requests may be taken from voice information that are received from microphone 124 or a combination of voice information and DTMF signals. The memory module 122 may be used for storing input data or storing programming information that is pre-loaded on the mobile handset 100, or that has been downloaded to the mobile handset 100.

The illustrative multimode wireless communication device comprises a CAT detection module 110 that is configured to detect the presence of at least one CAT without activating the corresponding inactive CAT receiver module. Additionally, the multimode wireless handset comprises a multimode receiver module 110 that comprises a plurality of CAT receiver modules, in which each CAT is associated with a particular CAT receiver module. In the illustrative embodiments presented herein, the multiple CATs are configured to share hardware such as antennas or the illustrative baseband ASIC described in further detail below.

During network communications, at least one CAT receiver module associated with the multimode receiver module 108 is active, and the other CAT receiver modules are inactive, thereby preserving battery resources. The CAT detection module 110 is also operatively coupled to the antenna 102, and is configured to detect a plurality of CAT RF energy levels associated with the inactive CAT receiver modules, at the same time as the active CAT receiver module receives RF signals corresponding to the active CAT. The wireless device 100 also has stored thereon an inactive CAT threshold level that is then compared to the corresponding CAT RF energy levels so that the comparison is performed without activating the inactive CAT receiver module.

Additionally, there may be devices capable of simultaneous operations where the device may be communicating with two separate networks using two CAT receiver modules, e.g. a WLAN and a WWAN operating simultaneously. The CAT detection module 110 may also assist simultaneous operation. For example, the device 100 may begin with just one active CAT receiver module, but if the signal strength of the active CAT begins to degrade then the CAT detection module is triggered and begins to detect inactive CATs. Additionally, if the energy level of one of the inactive CATs is above a threshold, the wireless device 100 begins simultaneous operation using the corresponding CAT receiver module without disrupting the operation of the active CAT receiver module, thereby providing a more seamless transition of service for the user between the two active CAT communications.

In operation, the multimode wireless communication device 100 collects RF samples taken at the output of the antenna system 102 by the CAT detection module 110 after filtering out undesired RF energy. By way of example and not of limitation, the process of filtering out undesired RF energy includes ensuring the CAT detection module 110 does not degrade the transmit and receive performance. To improve the performance of the CAT detector module, the transmit RF energy signals should be filtered out along with any out-of-band RF energy. One of the objectives for filtering out the undesired RF energy is to minimize the degradation of the noise floor and ensure that the CAT detection module 110 is not saturated with RF energy signals. If needed, a low-noise amplifier (LNA) along with Automatic Gain Adjust (AGC) may be added prior to sampling using an Analog to Digital Converter (ADC) as described in further detail below. To lower the cost of the ADC, under sampling may be used that requires the maximum sampling rates in the ADC be specified according to the maximum signal bandwidth of interest.

The energy levels associated with the sampled signals correspond to specific frequency bands and the type of modulation that are processed by the DSP 112. Thus, if the location of the wireless device 100 is not know, the appropriate CAT can be determined by the wireless device 100. By way of example and not of limitation, the computation in the DSP 112 may involve simple Discrete Fourier Transform filtering and summation. The resulting energy levels can be compared to a static or dynamic threshold to determine the likelihood of detection; and this approach has the advantage of processing all CATs supported by the device at one time.

Additionally, if the wireless handset 100 can determine its current location, i.e. country, this location information can be used to associate a frequency band with a particular CAT. In one embodiment the relationship between the frequency bands and the CATs for each country may be pre-programmed into the wireless device 100. By associating a frequency band with a country location, the wireless device 100 is configured to identify a detected frequency band with a particular CAT. Simply relying on energy detection for a frequency band may not result in successfully identifying the correct CAT. For example, detecting energy at 1.9 GHz does not necessarily mean that PCS CDMA is being used because the frequency band may also be GSM in North or South America. Thus, by pre-programming the frequency bands and CATs for specific countries into a wireless device, the wireless can more effectively determine the appropriate CAT for wirelessly communicating with the network.

Furthermore, after a particular CAT has been acquired based on a predetermined criteria, the handset 100 can consider reselection of another CAT. Thus, at least one CAT threshold level may be compared to the detected CAT energy levels that correspond to the inactive CAT receiver modules so that the results of the comparison are generated without activating the inactive CAT receiver modules.

Figure 3:
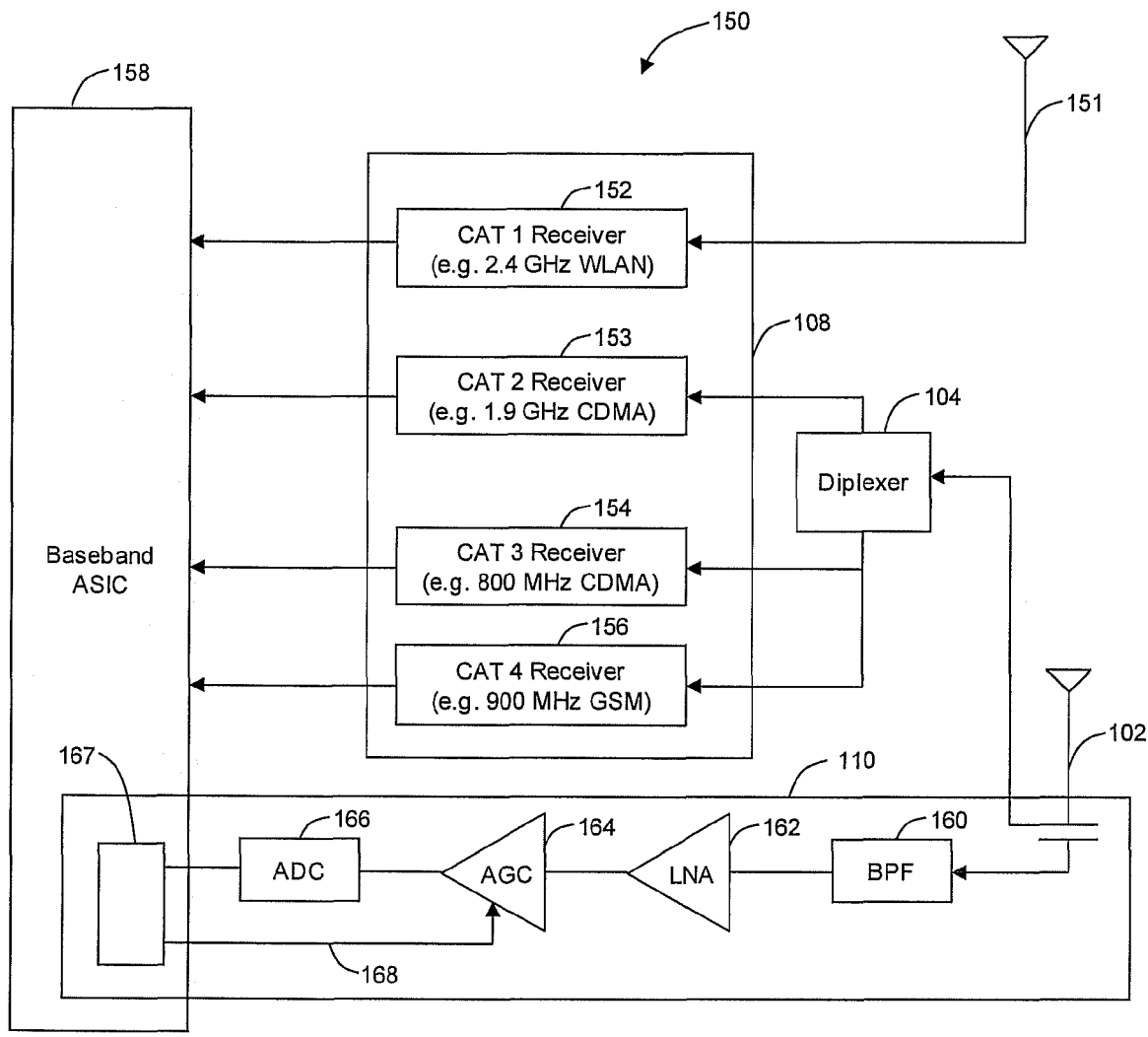
FIG. 3 shows another illustrative wireless device comprising four CAT receivers operatively coupled to a common antenna.

Referring to FIG. 3 there is shown a block diagram of another illustrative portable wireless device that detects multiple communication access technologies. The illustrative wireless device 150 comprises an antenna 102, a diplexer 104, a multimode receiver module 108, and a CAT detection module 110. A baseband ASIC 158 performs the operations of the DSP 112 shown in FIG. 2.

The multimode receiver module 108 includes four CAT receiver modules. Three CAT receiver modules are operatively coupled to the common antenna 102 via the diplexer 104. The first CAT receiver module 152 is operatively coupled to antenna 151 and communicatively coupled to baseband ASIC 158. The second CAT receiver module 153 operates using a CDMA implementation at 1.9 GHz. The third CAT receiver module 154 operates using CDMA at 800 MHz and the fourth CAT receiver module 156 operates using GSM at 900 MHz. During network operations at least one of the CAT receiver modules is active, and the remaining CAT receiver modules are in an inactive status. The CAT detection module may or may not be active.

For example, during an active call, at least one of the CAT receiver modules is active. The CAT detection module may become active as a result of trigger mechanisms. Possible trigger mechanisms to turn on the CAT detector module include location information, signal strengths of the active CAT and the detected CAT, user initiated applications and the desired quality of service (QoS).

The CAT detection module 110 provides a RF energy detection means that is operatively coupled to the antenna 102. The RF energy detection means is configured to detect a plurality of CAT energy levels associated with at least one inactive CAT receiver module. In operation, the RF energy detection means is configured to detect a plurality of CAT energy levels associated with at least one inactive CAT at the same time as an active receiver module receives RF signals corresponding to the inactive CAT.

The CAT detection module 110 is also coupled to the antenna 102 and is configured to reduce the power consumed to search for an alternate CAT. The RF samples are taken at the output of the antenna 102 by the CAT detection module 110. In the illustrative embodiment, the CAT detection module 110 is operatively coupled to antenna 102 and includes a band pass filter (BPF) 160 communicatively coupled to low-noise amplifier (LNA) 162. The BPF 160 is configured to filter out frequency bands not supported by the illustrative wireless device 150. Thus, the BPF 160 acts as a filtering module that is configured to select the frequency bands that are processed by the CAT detection module 110. It shall be appreciated by those of ordinary skill in the art that there are plurality of different types of filtering means or electronic filters that may also be used including, but not limited to analog filters, digital filters, passive filters, active filters, discrete-time filters, continuous time filters, linear filters, non-linear filters, infinite impulse response filters, FIR filters, band pass filters and other such filters.

The LNA 162 is configured to amplify the relatively weak signals received by the antenna and that passed the BPF 160. An Automatic Gain Control (AGC) 164 may be added prior to sampling using an Analog to Digital Converter (ADC) 166. The AGC 164 is a control circuit that automatically adjusts the gain with feedback from a logic circuit 167 residing within ASIC 158. The AGC 164 with feedback generates an output signal that remains constant despite variations with the input signal and prevents signal saturation. In one illustrative embodiment, the cost of the ADC 166 can be lowered by under sampling and specifying the maximum sampling rates in the ADC 166 according to the maximum signal bandwidth of interest. After filtering, gain adjustments, the samples are taken through the ADC and further processing is carried out by the DSP within the baseband ASIC 158. It shall be appreciated by those of ordinary skill in the art that the CAT detection module 110 described is provided for illustrative purposes only, and may operate with either the BPF 160, the LNA 162, the AGC 164, the ADC 166, being communicatively coupled to antenna 102, the logic 167 or any combination thereof.

With respect to stringent wireless standards requirement, each CAT receiver is required to satisfy the minimum performance requirements set forth by standards documents. In some instances, the operator may add stricter requirements than provided in the standard. Some of the main RF requirements for each CAT receiver include sensitivity, single-tone desense, adjacent channel selectivity, intermodulation response attenuation, and receive dynamic range. For example in CDMA the sensitivity requirement is set to −104 dBm and a CDMA receiver must meet this minimum requirement. In contrast, in the embodiments described herein the CAT detection module 110 may have a sensitivity of −94 dBm, or a relaxation of 10 dB, so that the inactive CAT threshold is greater than the wireless standard sensitivity requirement. The higher threshold will increase the probability of service being obtained with that CAT.

After network communications are initiated with the wireless device using the first CAT receiver module, the remaining CAT receiver modules are configured to be in an inactive state, and the CAT detection module 110 is configured to detect CAT RF energy levels corresponding to the second inactive CAT receiver module. One of the remaining inactive CAT receiver modules is activated when a corresponding detected CAT energy level exceeds an associated inactive CAT threshold level.

When the energy level in a frequency band exceeds a CAT threshold level, the illustrative device 150 determines the specific CAT that should be activated and the status of the inactive CAT receiver is converted to an active status. After the status of the CAT receiver has been converted to an active CAT status, wireless communications between the device and the network may fail, in which case the corresponding CAT threshold level is increased, and the CAT detection module 110 continues detecting CAT energy levels. The CAT detection module 110 does not require the same level of detection capability as a dedicated CAT receiver that will increase the probability of acquiring service. If the CAT detector has the same sensitivity as the dedicated receiver and the threshold is set close to the sensitivity, the result is that there are instances of switching without acquiring service. Once the CAT is detected, the illustrative device 150 may activate the corresponding CAT receiver to confirm detection, thus reducing the need for the dedicated CAT receiver to be turned on as frequently. The CAT detection module 110 may also support more frequent searches that consume less power and increase the likelihood of CAT detection.

In the illustrative wireless device 150, there are three separate CAT receiver modules 153, 154, and 156 that are operatively coupled to antenna 102 and a separate antenna 151 operatively coupled to an individual CAT receiver 152. In operation, communications are initiated with one of the four CAT receiver modules that operate in an active CAT receiver status. The remaining CAT receiver modules remain in an inactive status, until a threshold is exceeded, and the inactive CAT status is converted to an active CAT status. When there are two active CAT receiver modules, the wireless device 150 may look to a means for selecting an active receiver module such as a set of rules in the baseband ASIC 158 that determine the preferred CAT receiver module to use. The set of rules may be processed the DSP 112 and processor 114, and may be stored in memory 122. The set of rules may be updated using a Firmware Over-the-air (FOTA) upgrade, or by other such upgrading means as would be well known to those of ordinary skill in the art.

The CAT detection module is configured to determine the wireless standard associated with the detected CAT RF energy levels. The wireless standards is selected from the group of standards consisting of Code Division Multiple Access (CDMA), Global System for Mobile communications (GSM), Universal Mobile Telecommunications System (UMTS), Universal Mobile Broadband (UMB), wireless local area network (WLAN), wireless personal area network (WPAN), Mobile Broadband Wireless Access (MBWA) and Worldwide Interoperability for Microwave Access (WiMAX).

In the illustrative embodiment 150, the CAT detection module 110 reuses the existing antenna 102, and although the antenna system is designed for a specific CAT at supported frequency bands, the bandwidth of the antenna 102 is usually wide enough to cover multiple CATs in multiple frequency bands. Therefore, even if the frequency bands of interest have a 10 dB to 20 dB attenuation from the antenna 102, the reduced sensitivity does not affect the detection of CATs under a good signal environment. The antenna 102 may also be used to detect WLAN at other frequency bands (e.g. 2.4 GHz) even though the WLAN receiver module may use a separate antenna 151. For example, antenna 102 may be tuned to support one of the CATs associated with a wireless wide area network (WWAN) employing CDMA at both 800 MHz and 1.9 GHz, and second antenna 151 is optimized for a wireless local area network (WLAN) at 2.4 GHz. Since a CAT associated with WLAN has a much smaller coverage area than a WWAN, frequent searches for WLAN are wasteful and result in excessive power consumption. However, the CAT detection module may be coupled to either the WLAN antenna 151 (not shown) or the antenna 102 to reduce the need for the WLAN receiver module to operate frequently; thus reducing power consumption without reducing the likelihood of detecting a WLAN.

The CAT detection module 110 may also be configured to assist wireless devices that are capable of having two or more CATs operate simultaneously. More particularly, the CAT detection module 110 may be configured to assist the network in handoff from one CAT to another CAT. By way of example and not of limitation, the illustrative wireless device may have an active CAT receiver with degrading signal strength that triggers the CAT detection module 110 to begin detecting inactive CATs. Therefore, if the energy level of one of the inactive CATs is above a CAT threshold, the CAT detection module 110 informs the device to begin simultaneous operation using the corresponding CAT receiver module without disrupting the operation of the active CAT receiver. The device would inform the network that it would like to initiate a handoff to the newly "detected" CAT. This may provide a more seamless transition of service for the user between the two active CAT communications. Once the handoff is completed, the previous CAT receiver may be turned off. Thus, the CAT detector module 110 preserves battery resources by not turning on the CAT receiver unless the signal strength is acceptable. Additionally, if there is a plurality of CATs within a region that are capable of receiving a handoff, the CAT detection module 110 may be configured to compare the signal strengths of all available CATs without turning on all the inactive CAT receivers to make the comparison.

The CAT detection module 110 can also be applied to the currently proposed Multimode System Selection (MMSS) process. MMSS is an idle state behavior where the illustrative wireless device 150 selects the CAT it is going to use. In some instances, the device attempts to acquire a CAT using a location-based priority list. In other instances, the search for CATs may be based on the available input to the MMSS algorithm. These inputs may be location, application, history of acquisition, and other such inputs or triggers. With the illustrative CAT detection module 110, the detected CAT may serve as an additional input to the MMSS algorithm. Priority of the CAT acquisition scheme may be varied depending on the outcome of the CAT detection process.

Figure 4:
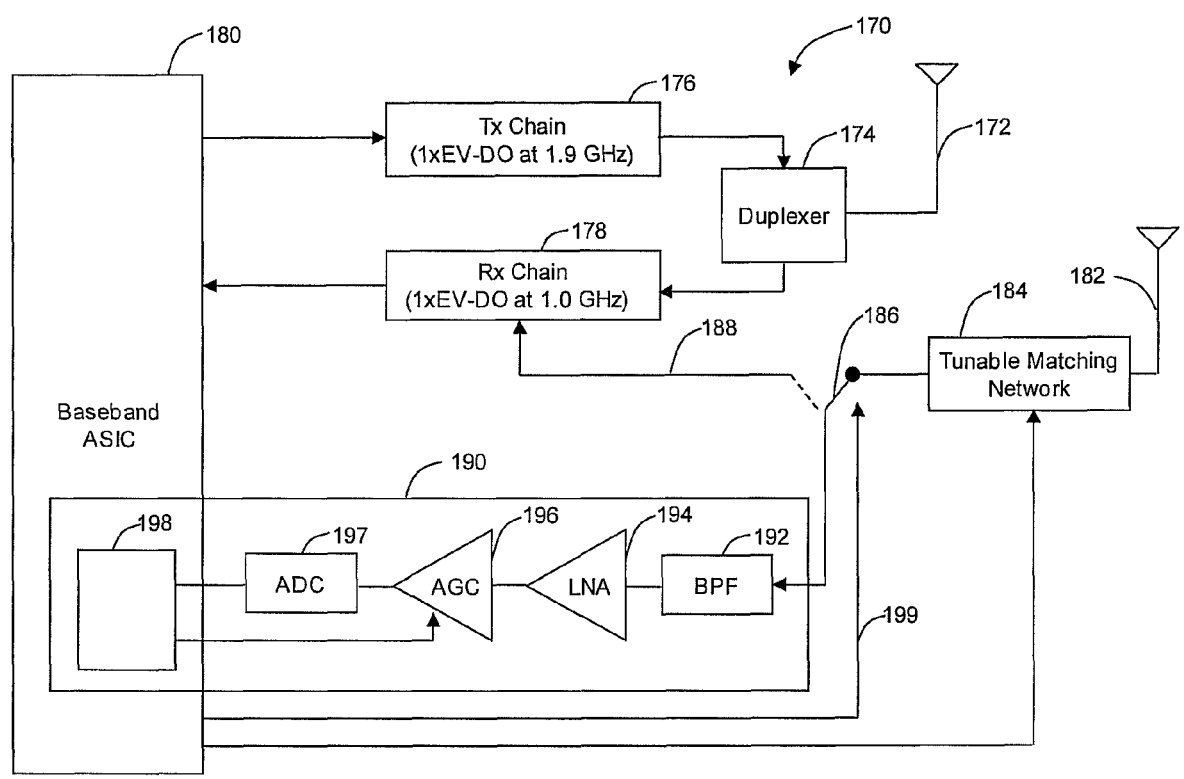
FIG. 4 shows an illustrative wireless device comprising a diversity antenna system coupled to a CAT detection module.

Referring to FIG. 4 there is shown yet another illustrative wireless device that includes a diversity antenna system coupled to a CAT detection module. The illustrative wireless device 170 communicates using a 1xEV-DO CAT operating at 1.9 GHz and employs a diversity receive antenna system for improved performance. The diversity antenna system comprises a first antenna 172 and a second antenna 182. The first antenna is coupled to a duplexer 174 that is operatively coupled to a CAT receiver module 178 and a CAT transmitter module 176, in which the CAT modules communicate with the baseband ASIC 180. It shall be appreciated by those of ordinary skill in the art having the benefit of this disclosure that a plurality of different CAT receiver modules and CAT transmitter modules may also be operatively coupled to the diversity antenna system and the baseband ASIC 180.

The second antenna 182 is operatively coupled to a tunable matching network 184 that can be reconfigured by the baseband ASIC 180 to optimize the detection of alternate CATs. The tunable matching network 184 is operatively coupled to a switch 186. The tunable matching network 184 is configured to be dynamically tuned to a particular frequency band for CAT detection by the illustrative ASIC 180. A more detailed description of an illustrative tunable matching network is provided in the commonly assigned U.S. Pat. No. 7,176,845 entitled "System and Method for Impedance Matching an Antenna to Sub-Bands in a Communication Band," which is hereby incorporated by reference in its entirety.

The switch 186 is operatively coupled to the 1xEV-DO CAT receiver module by line 188 and may be switched away from the 1xEV-DO service to the CAT detection module 190 by feedback 199 from the baseband ASIC 180. Thus, since the diversity antenna system incorporates the tunable matching network 184, the tunable elements may be reconfigured by the baseband ASIC 180 to optimize the detection of alternate CATs in other frequency bands.

The illustrative CAT detection module 190 provides a means for RF energy detection. The RF energy detection means is configured to detect a plurality of CAT energy levels associated with at least one inactive CAT receiver module. In operation, the RF energy detection means is configured to detect a plurality of CAT energy levels associated with at least one inactive CAT at the same time as an active receiver module receives RF signals corresponding to the inactive CAT. The CAT detection module 190 is configured to reduce the power consumed to search for an alternate CAT.

The illustrative CAT detection module 190 comprises a band pass filter (BPF) 192 communicatively coupled to low-noise amplifier (LNA) 194. The CAT detection module 190 is not directly coupled to the antenna, 182, but the CAT detection module 190 is indirectly coupled to antenna 182 through tunable matching circuit 184, and the combination of antenna 182 and matching circuit 184 would be considered an antenna system. The BPF 192 is configured to filter out frequency bands not supported by the illustrative wireless device 170, so the BPF 192 is a filtering module configured to select the frequency bands that are processed by the CAT detection module 170. An Automatic Gain Control (AGC) 196 is added prior to sampling using an Analog to Digital Converter (ADC) 197. The AGC 196 is a control circuit that automatically adjusts the gain with feedback from a logic 198 residing within ASIC 180. The AGC 196 with feedback generates an output signal that remains constant despite variations with the input signal and prevents signal saturation. After filtering, gain adjustments, the samples are taken through the ADC and further processing is carried out by the DSP within the baseband ASIC 158. It shall be appreciated by those of ordinary skill in the art that the CAT detection module 190 is provided for illustrative purposes only, and may operate with either the BPF 192, the LNA 194, the AGC 196, the ADC 197, the logic 198 or any combination thereof.

Figure 5:
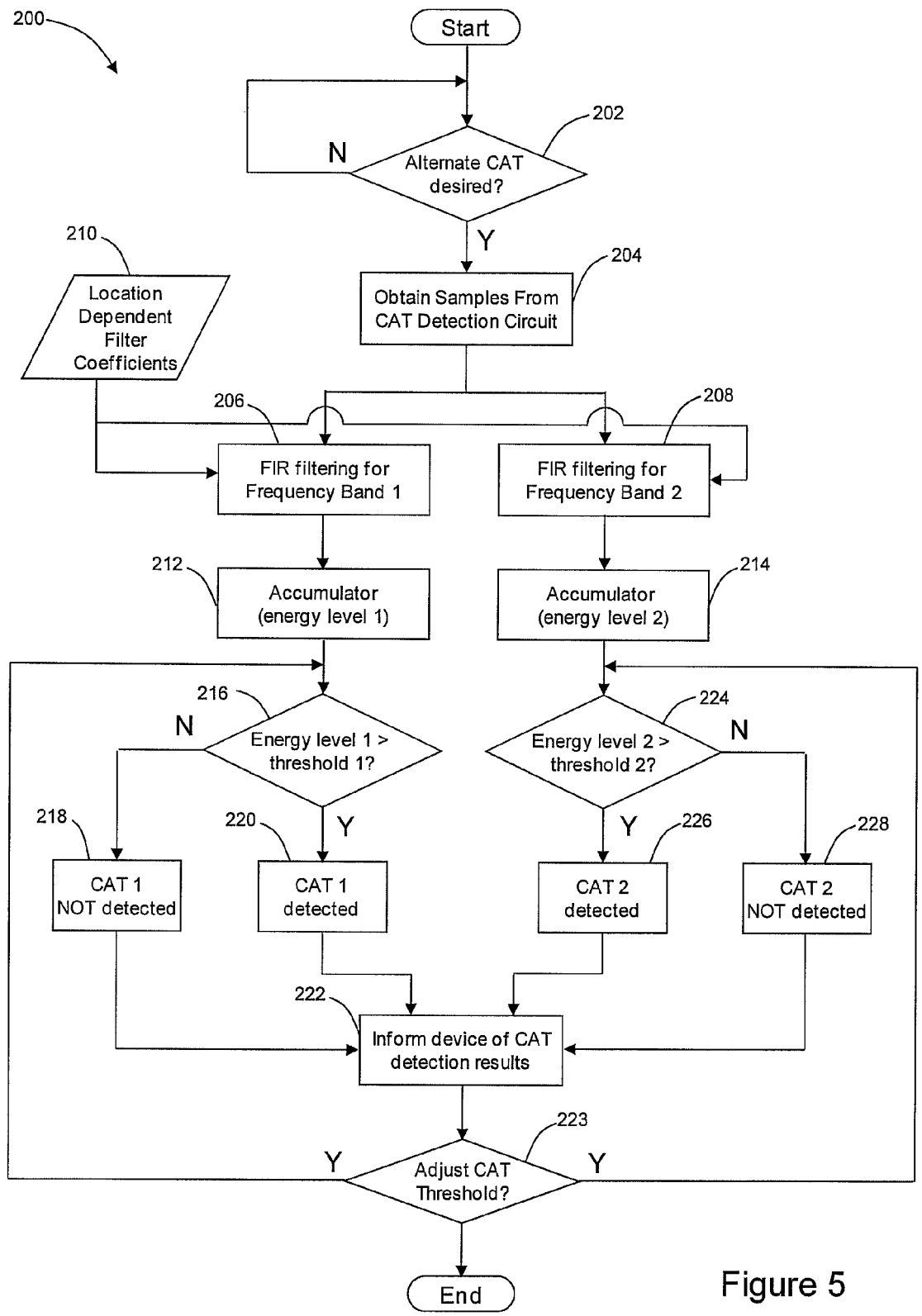
FIG. 5 shows an illustrative flowchart of a method for the multimode wireless communication device to detect at least one CAT without enabling the corresponding CAT transceiver module.

Referring to FIG. 5 there is shown an illustrative flowchart of a method for the multimode wireless communication device to detect at least one CAT without enabling the corresponding CAT receiver module. The illustrative method may be performed by the CAT detection module, at least two inactive CAT receiver modules and a logic component embodied in the DSP 112, the baseband ASIC 158, the baseband ASIC 180, the processor 114 or any other such logic component or combination of logic components associated with the multimode wireless communication device.

A method for a multimode wireless communication device to detect a communication access technology (CAT) is described that comprises processing RF signals that correspond to at least two CAT receiver modules with the CAT detection module that is operatively coupled to an antenna. Each CAT receiver module is configured to comply with the associated wireless standard having a receiver requirement. The method then proceeds to detect a plurality of CAT RF energy levels with the CAT detection module, in which the CAT RF energy levels are associated with each inactive CAT. The CAT energy levels are compared to at least one CAT threshold so that the results of the comparison are generated without activating the corresponding CAT receiver module, and the CAT threshold is greater than the wireless standard sensitivity requirement. Each inactive CAT receiver module is activated after the inactive CAT energy level exceeds the corresponding inactive CAT threshold level. During instances where the recently activated CAT receiver module is unable to initiate communications using the inactive CAT, the inactive CAT threshold is increased. By way of example, and not of limitation, the wireless standards is selected from the group of standards consisting of Code Division Multiple Access (CDMA), Global System for Mobile communications (GSM), Universal Mobile Telecommunications System (UMTS), Universal Mobile Broadband (UMB), wireless local area network (WLAN), wireless personal area network (WPAN), Mobile Broadband Wireless Access (MBWA) and Worldwide Interoperability for Microwave Access (WiMAX).

In operation, the CAT detection module is configured to operate at the same time as an active CAT receiver module as described above. The method detects a plurality of inactive CAT energy levels associated with each inactive CAT as described in further detail below. Simultaneously, the active receiver module receives RF signals corresponding to the active CAT as described above. The method compares the inactive CAT energy levels to an inactive CAT threshold so that the results of the comparison are generated without activating the inactive CAT receiver module that corresponds to the inactive CAT. The method reduces power consumption by detecting the inactive CAT without having to activate the inactive CAT receiver module, unless it is necessary to wake up the dedicated CAT receiver to confirm that the CAT may be used.

The method is initiated at decision diamond 202 where a trigger is defined that determines when a search for another CAT is to be initiated. By way of example and not of limitation, the trigger may be based on device location, a location-based priority list, the application running on the wireless device, history of acquisition, user initiated request or demand, periodical changes of the desired CAT, based on motion of the wireless device, remaining battery resources, and other such inputs. Furthermore, by way of example and not of limitation, decision diamond 202 can also determine which CATs the CAT detection module will search based on roaming agreements and the QoS requirements necessary for the user-initiated application.

After a determination has been made that an alternate CAT is desired, the method proceeds to block 204 where RF energy samples gathered by the CAT detection circuit or module are obtained. A plurality of frequency bands that are processed by the CAT detection module may be identified at block 204. By way of example, the CAT detection module is configured to obtain samples that correspond to two inactive CAT receiver modules.

The RF energy samples are processed by the CAT detection circuit as described above, and then communicated to the logic component. For the illustrative method, the logic components includes two filter banks as shown in blocks 206 and 208, in which the illustrative digital filters are Finite Impulse Response (FIR) filters that operate within a first frequency band and a second frequency band, respectively. By way of example and not of limitation, the first frequency band may be associated with a GSM CAT and the second frequency band may be associated with a CDMA CAT. Other frequency bands may also be accommodated including WLAN frequency bands. It shall be appreciated by those of ordinary skill in the art that more than two filter banks may be used and that there are a plurality of different digital filters that may be embodied in the illustrative logic component that would readily suggest themselves to those of ordinary skill in the art.

By way of example and not of limitation, the illustrative trigger is location-specific and is derived from data block 210 having location dependent filter coefficients. Therefore, depending on the location of the illustrative wireless device, there are certain frequency bands that correspond to a particular CAT that may or may not be available. Additionally, the illustrative location trigger may also take into account roaming agreements and the QoS required by the user-initiated application that dictate the use of each CAT.

With respect to the first CAT frequency band, the method then proceeds to block 212 where energy levels are accumulated. At decision diamond 216, the detected energy levels are calculated for the first frequency band and the detected energy levels are compared to the corresponding first CAT threshold level; this process provides a high likelihood of detection for the first CAT. The first CAT threshold levels may be static or dynamic. If the first CAT threshold level is not exceeded, the method proceeds to block 218. However, if the first CAT threshold is exceeded, the method proceeds to block 220 where an indication is generated that the first CAT has been detected. The method then proceeds to block 222 where the illustrative wireless device is informed that there is either a high likelihood for detection of the first CAT or that the first CAT has not been detected.

Since the operations performed by decision diamond 216 only provide a high likelihood for detection, the CAT receiver modules may be activated at block 222 to confirm that the first CAT has been detected. The method then proceeds to decision diamond 223 where the first CAT threshold is adjusted, i.e. increased, if the dedicated first CAT receiver module is unable to acquire the first CAT at block 222. Thus, the increased first CAT threshold derived from decision diamond 223 is communicated to decision diamond 216, where the detected energy levels for the frequency band are compared to the recently revised CAT threshold level.

Figure 6:
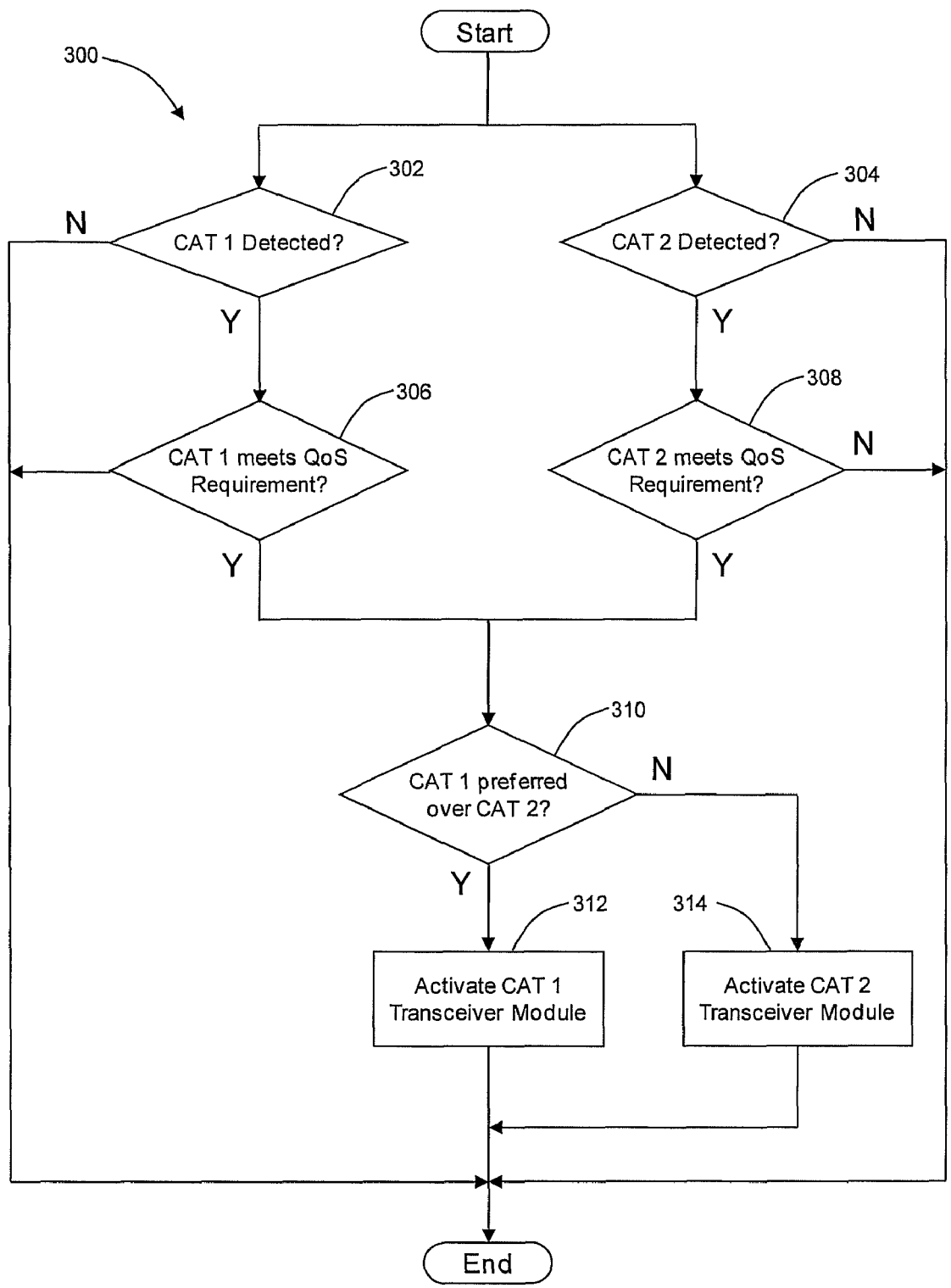
FIG. 6 shows an illustrative flowchart of a method for the illustrative multimode wireless device to determine the activation of one of the two CAT transceiver modules.

Referring now to FIG. 6, there is shown an illustrative flowchart of a method for the illustrative multimode wireless device to determine the activation of one of the two CAT transceiver modules. Continuing from the information received in 222, FIG. 6 shows an illustrative flowchart of a method for the multimode wireless communication device to determine whether one of the two CAT transceiver modules should be activated. Decision diamond 302 determines whether the first CAT is detected by the CAT detector module. If the first CAT is detected, the method proceeds to decision diamond 306 where the first CAT is compared with the QoS requirements of the user-initiated application. The same method is used for the second CAT for decision diamonds 304 and 308 wherein the decision is made as to whether the second CAT also meets the QoS requirements of the user-initiated application. The method proceeds to the decision diamond 310 where the decision is made as to which of the two CATs is preferred based on the QoS requirements. If the first CAT is preferred over the second CAT, the CAT transceiver module corresponding to the first CAT is activated in 312. If the second CAT is preferred over the first CAT, the CAT transceiver module corresponding to the second CAT is activated in 314.

The method for the illustrative multimode wireless device to determine the activation of one of the two CAT transceiver modules described in FIG. 6 is also applicable to the remaining process blocks in FIG. 5. Referring back to FIG. 5, the method is repeated with the second CAT frequency band, when the method proceeds from block 208 to block 214, in which energy levels are accumulated. At decision diamond 224, the detected energy levels are calculated for the second frequency band and the detected energy levels are compared to the corresponding second CAT threshold level; again, this process provides a high likelihood of detection for the second CAT. The second CAT threshold levels may be static or dynamic. If the second CAT threshold level is not exceeded, the method proceeds to block 228. However, if the second CAT threshold is exceeded, the method proceeds to block 226 where an indication is generated that the first CAT has been detected. The method then proceeds to block 222 where the illustrative wireless device is informed that there is either a high likelihood for detection of the second CAT or that the second CAT has not been detected.

The operations performed by decision diamond 224 only provide a high likelihood for detection and the CAT receiver modules must be activated at block 222 to confirm that the second CAT has been detected. The method then proceeds to decision diamond 223 where the second CAT threshold is increased if the dedicated second CAT receiver module is unable to acquire the second CAT at block 222. The increased threshold is communicated to decision diamond 224 where the detected energy levels for the frequency band are compared to the recently revised CAT threshold level.

Although the flowchart described above in FIG. 5 describes more than one inactive CAT receiver modules, the method can also be applied to a single inactive CAT receiver or transceiver. It is to be understood that the detailed description of illustrative embodiments are provided for illustrative purposes. The scope of the claims is not limited to these specific embodiments or examples. For example, a wireless handset 100 is described, however this solution may be extended to any source electronic device. Therefore, various elements, details, execution of any methods, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A multimode wireless device, comprising:
    a multimode transceiver module operatively coupled to at least one antenna, the multimode transceiver module comprising at least two communication access technology (CAT) transceiver modules operatively coupled to at least one antenna, wherein each CAT transceiver module complies with a CAT receiver requirement, wherein the at least two CAT transceiver modules comprise a first CAT transceiver module that is configured to enter an active state and a second CAT transceiver module that is configured to be in an inactive state;
    a CAT detection module operatively coupled to a CAT transceiver antenna, wherein the CAT detection module complies with different requirements than the CAT receiver requirements, the CAT detection module configured to detect a plurality of CAT RF energy levels associated with each CAT transceiver module, wherein the CAT detection module is further configured to detect CAT RF energy levels corresponding to the second CAT transceiver module in the inactive state;
    at least one CAT threshold level that is compared to the detected CAT RF energy levels so that the comparison is performed without activating the corresponding CAT receiver module.

2. The multimode wireless device of claim 1 wherein the second CAT transceiver module is configured to be activated when a second detected CAT energy level exceeds a second CAT threshold level.

3. The multimode wireless device of claim 1 wherein the wireless standards is selected from the group of standards consisting of Code Division Multiple Access (CDMA), Global System for Mobile communications (GSM), Universal Mobile Telecommunications System (UMTS), Universal Mobile Broadband (UMB), wireless local area network (WLAN), wireless personal area network (WPAN), Mobile Broadband Wireless Access (MBWA) and Worldwide Interoperability for Microwave Access (WiMAX).

4. The multinnode wireless device of claim 3 wherein the CAT detection module is configured to determine the wireless standard associated with the detected CAT RF energy levels.

5. The multimode wireless device of claim 1 wherein the CAT detection module is configured to reduce power consumption by only activating an inactive CAT receiver module when the corresponding inactive CAT threshold is exceeded.

6. The multimode wireless device of claim 1 wherein the CAT detection module further comprises a filtering module that is operatively coupled to the antenna, the filtering module configured to select a plurality of frequency bands that are processed by the CAT detection module.

7. The multimode wireless device of claim 6 further comprising a location component that identifies a location for the multimode wireless device and the location of the multimode wireless device determines the configuration of the filtering module.

8. The multimode wireless device of claim 7 wherein the filtering module associates a particular frequency band with a particular CAT.

9. The multimode wireless device of claim 8 wherein the CAT detection module is configured to determine the wireless standard associated with the detected CAT RF energy levels.

10. The wireless device of claim 1 further comprising a tunable matching network that is configured to be dynamically tuned to a particular frequency band for CAT detection by the CAT detection module.

11. The wireless device of claim 1 further comprising,
at least two CAT transceiver modules, wherein each CAT receiver module is operatively coupled to the antenna;
at least two CAT threshold levels; and
a means for selecting between the at least two CAT transceiver modules.

12. A multimode wireless communication device, comprising:
a multimode transceiver module operatively coupled to at least one antenna, the multimode transceiver comprising at least two communication access technology (CAT) transceiver modules operatively coupled to at least one antenna, wherein each CAT transceiver module complies with a CAT receiver requirement, and wherein a first CAT transceiver module of the at least two CAT transceiver modules is configured to enter an active state and a second CAT transceiver module is configured to be in an inactive state;
a CAT detection module operatively coupled to a CAT transceiver antenna wherein the CAT detection module complies with different requirements than the CAT receiver requirements, the CAT detection module configured to detect a plurality of CAT RF energy levels associated with each CAT transceiver module without activating the corresponding CAT transceiver module; wherein the CAT detection module is further configured to detect CAT RF energy levels corresponding to the second CAT transceiver module in the inactive state; and
a triggering event that activates the CAT detection module comprising,
at least one inactive CAT threshold level that is compared to the detected CAT RF energy levels; and
a logic component that activates the first CAT transceiver module based on the result of the comparison.

13. The multimode wireless communication device of claim 12 wherein the CAT receiver requirement is the CAT receiver sensitivity requirement and at least one inactive CAT threshold is greater than the corresponding CAT receiver sensitivity requirement associated with the CAT transceiver module.

14. The multimode wireless communication device of claim 13 wherein the CAT receiver requirement complies with a wireless standard.

15. The multimode wireless communication device of claim 12 wherein the triggering event that activates the CAT detection module further comprises a location component that determines the location of the multimode wireless communication device.

16. The multimode wireless communication device of claim 12 wherein the triggering event that activates the CAT detection module further comprises a means for detecting changes to signal strength.

17. The multimode wireless communication device of claim 12 wherein the triggering event that activates the CAT detection module further comprises a quality of service (QoS) requirement that is associated with at least one user initiated application.

18. The multimode wireless communication device of claim 17 wherein the triggering event that complies with the QoS requirement for the corresponding user initiated application activates the CAT detection module.

19. A method for a multimode wireless communication device to detect a communication access technology (CAT), the method comprising:
coupling a CAT detection module to a CAT transceiver antenna;
processing RF signals that correspond to at least two CAT transceiver modules that are operatively coupled to at least one antenna, wherein each CAT transceiver module complies with a CAT receiver requirement, wherein a first CAT transceiver module of the at least two CAT transceiver modules is configured to enter an active state and a second CAT transceiver module is configured to be in an inactive state;
detecting a plurality of CAT RF energy levels with the CAT detection module without activating the corresponding CAT transceiver module, wherein the CAT RF energy levels are associated with each CAT, wherein the CAT detection module is further configured to detect CAT RF energy levels corresponding to the second CAT transceiver module in the inactive state;
enabling the CAT detection module to comply with different requirements than the CAT receiver requirements; and
determining when to activate the CAT detection module by comparing at least one CAT threshold to the detected CAT RF energy levels.

20. The method of claim 19 wherein at least one inactive CAT threshold is greater than the corresponding CAT receiver requirement associated with the CAT transceiver module.

21. The method of claim 20 wherein the CAT receiver requirement complies with a wireless standard.

22. The method of claim 19 wherein determining when to activate the CAT detection module further comprises determining a location for the multimode wireless communication device.

23. The method of claim 19 wherein determining when to activate the CAT detection module further comprises detecting changes to signal strength.

24. The method of claim 19 wherein determining when to activate the CAT detection module further comprises a quality of service (QoS) requirement that corresponds to at least user initiated application.

* * * * *